United States Patent Office 3,325,339
Patented June 13, 1967

3,325,339
MAGNETIC TAPE LAMINATING PROCESS AND PRODUCT
Donald E. McBournie, Pittsfield, and Robert A. Pfister, Dalton, Mass., assignors to General Electric Company, a corporation of New York
No Drawing. Filed Mar. 20, 1964, Ser. No. 353,589
20 Claims. (Cl. 161—93)

ABSTRACT OF THE DISCLOSURE

A magnetic recording tape consisting of a supporting layer of a woven or non-woven glass fabric impregnated with a polycarbonate and a magnetically susceptible layer consisting of magnetically susceptible material dispersed in a polycarbonate, said magnetically susceptible layer being in fused, coextensive, adherent contact with said supporting layer. The two layers are joined without using solvent or adhesives by heat and pressure.

---

This invention relates to an improved magnetic recording tape comprising a magnetically susceptible polycarbonate lamina united to a polycarbonate supporting lamina, the latter preferably being reinforced with glass fabric. This invention further relates to a process of preparing such a laminate wherein a magnetically susceptible polycarbonate lamina is formed by solution casting upon a temporary support with evaporation of solvent therefrom prior to uniting with a supporting polycarbonate lamina to form the product of this invention.

Commercially available magnetic tapes generally comprise a magnetic oxide, resinous binder composition applied as a coating to a thermoplastic film backing as exemplified by cellulose acetate or polyethylene terephthalate (Mylar) film. Such tapes, while satisfactory for conventional audio or video use, have been found to be critical deficient for more sophisticated electronic applications, particularly in automatic data processing and storage systems. Among these deficiencies are relatively poor adhesion, for these applications, of the magnetic coating to the film, unsatisfactory dimensional stability, excessive elongation, and often a relatively high noise level.

Many of these problems have been partially met in the prior art by tapes comprising a polycarbonate base coated with a magnetic oxide, polycarbonate binder composition. Such polycarbonate systems offer particular advantages including greater resistance to moisture, as well as enhanced dimensional stability, mechanical strength and temperature resistance. However, all the prior art polycarbonate tapes require that either the polycarbonate backing composition or the polycarbonate magnetic coating composition be applied to the other as a solution or dispersion in volatile solvent. In such procedures there is invariably a solvent attack upon the polycarbonate material to which the solvent composition is applied. The most apparent and deleterious effect of this solvent attack is the resulting cupping, curling, or crinkling of the tape. Further, because of this solvent effect it is almost impossible to form a magnetic coating which is dimensionally uniform, particularly with respect to the thickness of the coating which, to secure optimum noise reduction, should be substantially constant along the length and across the width of the tape.

Further, there are shown in the prior art various laminated magnetic tapes which, however, require in every instance between the magnetic lamina and the base lamina the use of an adhesive composition. Use of such adhesive interlayers, however, has been found to result in substantial loss of dimensional stability in the presence of heat and moisture without any significant improvement in the mechanical strength of the laminate, the principal improvement being here the enhanced adhesion of the magnetic layer to the backing.

According to this invention there is provided a laminated magnetic tape comprising a supporting or base lamina and a magnetically susceptible supported lamina in co-extensive, direct, adherent contact with a surface of the supported lamina. The supporting or base lamina comprises a polycarbonate composition and the magnetically susceptible supported lamina is formed of a composition comprising a magnetically susceptible material and a polycarbonate binder. Both of the base and supported lamina are in essentially volatile solvent free state upon assembly of the laminate. The supporting or base lamina is characterized by having been dimensionally sized by prior application of heat and pressure. In the resulting composite laminate, which is generally assembled under heat and pressure, the respective laminae are at their common interface without any mutual solvent interaction or attack and in a condition of substantially permanent mutual adhesion notwithstanding the absence of any adhesive or priming interlayer. The magnetically susceptible lamina of the magnetic laminate of this invention exhibits in addition to its substantially improved adhesion to the base a relatively constant thickness, whereby there is obtained an optimum reduction of noise level in the product.

It is preferred that the base or supporting lamina of this invention comprise a multi-filament glass fabric impregnated with a polycarbonate composition. The product of this invention is of particular utility in automatic data processing equipment and astro-electronic recording devices and represents a substantial improvement over the prior art in such properties as its greater dimensional stability, its very low permanent set, and its decreased elongation, as well as in its greater resistance to heat and moisture.

Still further, according to this invention, there is provided as a broad mode of practice thereof a process whereby the magnetically susceptible lamina may be formed in substantially volatile solvent-free condition and united by the application of heat and pressure with a polycarbonate base or supporting lamina which has been dimensionally sized by the prior application of heat and pressure. In combination, this process comprises the steps of coating a temporary support with a composition comprising a polycarbonate binder, a volatile organic solvent therefor and a dispersion therein of a magnetically susceptible material; magnetically orienting the applied fluid coating; and drying the composition by evaporation of the solvent from the temporary support, thereby forming the magnetically susceptible lamina thereupon. The lamina thus formed is united with a polycarbonate base with application of heat and pressure, the temporary support then being stripped therefrom.

The process of this invention preferably comprises further in combination the steps of impregnating a multi-filament glass fabric with a polycarbonate composition and a volatile organic solvent therefor, and the removal by evaporation of the volatile solvent, thereby forming the supporting or base lamina. The base thus formed is then dimensionally sized by heat-pressing or ironing, or the like, to assure an optimum thickness uniformity and smoothness of the surface. The base lamina as thus prepared is then united by heat and pressure with the magnetic lamina as above described.

The polycarbonate resins used in this invention for impregnating the base lamina and as binders in the magnetic lamina comprise polyesters of carbonic acid and a polyhydroxy organic compound. Such polycarbonates are generally produced by the reaction of a polyhydroxy organic compound with phosgene, carbonic acid di-esters, or poly-chlorocarbonic acid esters of a polyhydroxy organic compound. The polyhydroxy organic compound, which may be aliphatic, aromatic or heterocyclic, is most commonly a di-hydroxy compound as exemplified by the di-(monohydroxyaryl)-alkanes. Exemplary of this class of materials is bisphenol A which is 4,4'-di-hydroxy diphenyl dimethyl methane. Other polyhydroxy and di-hydroxy materials may be employed in the preparation of the polyester either alone or in combination. Among the commercially available polycarbonate resins which may be employed in this invention are the Lexan polycarbonates which are sold by The General Electric Company. Exemplary of Lexan polycarbonates which have been found particularly satisfactory in the practice of this invention are those disclosed in Canadian Patent No. 661,282 and U.S. Patent No. 2,999,835, the respective specifications of which are incorporated herein by reference. The polycarbonate resins may include plasticizers, stabilizers, fillers, curing agents, dyes, pigments, and related additives as known in the art.

The magnetically susceptible material comprising the magnetic lamina in combination with a polycarbonate resin binder is not especially critical and can readily be selected by persons skilled in the art. Suitable materials include, among other ferromagnetic substances, the ferromagnetic oxides of the transition metals, as well as ferromagnetic metals and their alloys as, for example, iron powder. Among the more commonly used ferromagnetic oxides are $Fe_3O_4$ and gamma $Fe_2O_3$. A preferred magnetic oxide, because of its convenient commercial availability, is the gamma $Fe_2O_3$ sold by the C. K. Williams Company under the trade name IRN 130.

The magnetic lamina is formed by the application of a fluid coating to a temporary support. The fluid coating composition comprises a polycarbonate resin, a solvent therefor, and a dispersion of the magnetic material therein. The solvent may be any of the known volatile polycarbonate solvents including lower molecular weight alkyl halides as exemplified particularly by methylene chloride, ethylene chloride, trichloroethane, and chloroform. The coating composition may otherwise include as necessary plasticizers, stabilizers, pigments, dyes, fillers, and other solvents, as well as surface active or dispersing agents. The use of a dispersing agent is often desirable, and among those which have been found to give satisfactory results is Ten-Lo-70 sold by the Nopco Chemical Company which has particularly recommended its use with iron oxide dispersions.

The following examples are illustrative of the magnetic oxide dispersions used in the practice of this invention.

*Example 1*

| | |
|---|---|
| Solids, percent, by weight | 20 |
|    Lexan Polycarbonate Resin No. 125 ____parts__ | 20 |
|    Magnetic pigment (IRN 130) _____do____ | 78 |
|    Ten-Lo-70 _____do____ | 2 |
| Solvent, percent by weight | 80 |
|    Trichloroethane _____parts__ | 400 |

The polycarbonate resin is of a film casting grade and particularly suited for obtaining optimum film properties. The resin is completely dissolved in the solvent and the dispersion then milled in a high speed ball mill for a number of hours. The milled dispersion is pressure filtered prior to storing.

*Example 2*

| | |
|---|---|
| Solids, percent by weight | 20 |
|    Lexan of intrinsic viscosity 0.57 _____parts__ | 30 |
|    Magnetic pigment (IRN 130) _____do____ | 68 |
|    Ten-Lo-70 _____do____ | 2 |
| Solvent, percent by weight | 80 |
|    Trichloroethane _____parts__ | 400 |

This dispersion is treated similarly to Example 1 and while likewise having a solids content of 20% otherwise differs in that the resin used as the binder is of a lower intrinsic viscosity and is present in larger proportion.

The magnetic dispersion is cast upon a temporary backing. The temporary support should have a smooth, highly polished surface substantially nonadherent to the magnetic lamina and stable under the conditions of heat and pressure encountered in this process. The temporary support may be a plastic film, as exemplified by Mylar, or a metallic sheet or web, as exemplified by aluminum foil, chrome-plated steel, or stainless steels. The temporary support may be in the form of a continuous strip or it may be a relatively short endless belt.

Any convenient casting or coating means operative within the limitations of this invention may be used. In many applications the coating may most conveniently be effected with a doctor blade. The doctor blade should have an absolutely flat, metering surface and the belt or tape should be traveling through the opening thereof at a uniform rate. The doctor blade may be adjusted to yield the desired final laminar thickness which should be essentially constant so that both laminar surfaces are of optimum smoothness and flatness. In general, the thickness of the cast dispersion should be five to ten times the thickness of the dry lamina. For a doctor blade setting of 0.002 inch from the top surface of the suport, a dry lamina of 0.0004 inch was obtained with the dispersion of Example 1.

Following the coating step the magnetic dispersion is oriented by any convenient magnetic orienting means, following which the dispersion is dried. The drying procedure may include air drying. Any convenient drying means may be employed, singly or in combination, including ovens, radiant heaters, blowers or the like. After drying the magnetic lamina must be substantially free of volatile polycarbonate solvent. This is a critical requirement of the process and necessary to secure the superior properties of the resulting magnetic tape. As will be described below, the magnetic lamina is then pressure laminated to the base. In one preferred embodiment of this invention, an endless temporary backing is used and travels at a constant rate through the complete process, any point thereupon returning under a coating head or means after being stripped from the final laminate.

The permanent base or supporting lamina of this invention also comprises a polycarbonate composition. In a preferred mode of practice of this invention, the base lamina further includes a multi-filament glass fabric reinforcement, which may be composed of either a woven or unwoven glass fabric. The woven fabric, which is suited for use for highly sensitive electronic applications, may be selected by those skilled in the art in order to produce in the final laminate the necessary specifications and properties as might be conferred by the starting reinforcement material. Accordingly, the weave may be plain, twilled, single or double face satin construction, etc. The warp is composed of continuous multi-filament glass yarn, thread, or roving to confer a high unidirectional tensile strength and dimensional stability to the product. The weft, or fill, yarn, thread, or roving is formed of very thin filaments providing flexural strength, tear resistance and lateral dimensional stability as necessary to the final product. Exemplary of materials found to be satisfactory in the practice of this invention are glass fabrics comprised of from 60 to 130 D–900 yarns in the warp and from 50 to 70 D–1800 yarns in the weft with the weave being either plain or satin. A tight weave pattern has been found necessary for optimum surface smoothness of the completed supporting lamina. Materials which have been found highly satisfactory are Style No. 103 commercially available from the Exeter Manufacturing Company and Style 100 commercially available from the Hess Goldsmith Company.

Especially advantageous results may be achieved by distoring the weave pattern and it is a further discovery of this invention that by such distortion of the weave pattern there results a considerable improvement in the crease resistance of the fabric and in the surface flatness thereof. The distorted fabric of this mode of our invention is characterized by weft filaments lying at substantially a 15° to 45° angle with respect to the warp filaments. A distorted fabric conferring these exceptional properties upon the product of this invention may be formed by either a special weaving process or by distorting the weave pattern during the various treatment steps described herein. Distortion of the weave pattern is conveniently effected by pulling the fabric on a bias through the system. The treatment otherwise of the distorted fabric is identical with that described herein with reference to the woven fabric of this invention.

Non-woven reinforcing fabrics which are particularly suited for use in less sensitive applications are composed of continuous unidirectional, parallel, evenly spaced, continuous multi-filament glass threads, yarns or rovings as the warp thereof, with the weft, or fill, being laid on top of and perpendicular thereto. In a preferred mode, this is a continuous operation including the subsequent impregnation of a polycarbonate resin solution as well as all necessary pre-treatments of the glass fabric described hereinbelow. Conventional equipment may be employed to carry out this process. Otherwise, any of the commercial available non-woven glass fabrics may be used.

The initial process step in the preparation of the base or supporting lamina is to impregnate the glass fabric with a polycarbonate composition. This and subsequent steps, while described herein with particular reference to a woven fabric, are equally applicable to the use of a non-woven fabric, as well as the woven distorted fabric which has been described above as being especially advantageous in the properties conferred upon the final product. The glass fabric, whether woven in situ or commercially available, may be subject to a number of pre-treatment steps which are in general optional although several of them to be commented upon do furnish especially desirable properties in the product.

It has been found that by pre-coating or priming the glass fabric with a highly elastic polycarbonate-compatible resin prior to the polycarbonate impregnation there is produced a considerable and surprisingly enhancement of the flexibility and tear strength of the base lamina and the final laminate. Illustrative of the elastomeric materials which have been found suitable are ethylene propylene rubber, polyisobutylene, polycarbonate elastomers, silicone fluids, and polyethylene-vinyl acetate copolymers.

Of these substances the polyethylene-vinyl acetate copolymer elastomers have been found especially useful. Commercially available polyethylene-vinyl acetate copolymer compositions are available from E. I. duPont de Nemours and Company under the trade name Elvax. The priming or pre-coating step is very simply performed with conventional equipment. For example, a preferred material Elvax 150 is applied to the glass fabric from a 5% to 10% toluene solution and then dried. As elaborate metering devices are generally not needed for this processing step, very little fabric damages occur. The addition of the primers can result in a 10° to 15° increase in tensile strength and by increasing the elasticity of the glass-resin bond area there is also increased fatigue resistance and flexibility of the tape.

Another useful primer or pre-coating composition is a nitrile-silicone fluid available from the General Electric Company under the designation XF–1150. While the results obtained with this material are generally comparable to those obtained with Elvax 150, there is a considerable increase in the moisture resistance of the finished tape.

The primer may be applied directly to as-received commercial fabrics. Such commercially available fabrics frequently contain as sizing thereupon starch-oil binders. The binders tend to reduce the flattening or stacking efficiency of the impregnated fabric when subjected to subsequent heat pressing operations. The presence of these binders also results in a somewhat weaker glass-to-resin bond. In order to obtain optimum finished product properties the fabric may be de-sized. This is conveniently accomplished by heating the fabric at temperatures in excess of the decomposition point of the binders by conventional processes. The heat cleaning step, while yielding a product having optimum desirable properties, is nevertheless not always essential to this process and, as stated, the as-received fabric with the starch-oil sizing may be either directly impregnated with a polycarbonate resin solution or directly pre-coated with an elastomeric primer composition prior to such impregnation. The de-sized fabric will furnish a product having somewhat reduced thickness and tear strength than derived from the sized starting fabric. It has been found that this thickness and tear strength problem may be solved as necessary by coating the heat cleaned glass fabric with a glass fabric silicone finish (available from The General Electric Company under the designation XM–2019). The silicone may be then cured under pressure to compress the fabric to minimum thickness, following which the primer may be added followed by polycarbonate impregnation.

The glass fabric reinforcement then, whether as-received or subjected to such of the above-described pre-treatment, precoating, and priming steps as are required, is then subjected to impregnation by a composition comprising a polycarbonate resin in solution in a volatile organic solvent therefor. The polycarbonate resins employed for the impregnation are preferably of lower molecular weight which yield more satisfactory properties than higher molecular weight molding grade resins. The optimum molecular weight has been found to be substantially within the range of 15,000 to 20,000 inclusive, whereas standard molding grades of Lexan polycarbonates, for example, are in the 28,000 molecular weight range. The preferred materials have an intrinsic viscosity of approximately 0.35. Among the volatile organic polycarbonate solvents which may be used are methylene chloride, ethylene chloride, trichloroethane, and chloroform. For the present purpose methylene chloride the preferred solvent and, for example, a highly satisfactory impregnating solution comprises a 18% methylene chloride solution of a Lexan polycarbonate resin of intrinsic viscosity 0.35. The impregnating composition may otherwise as necessary include dyes, pigments, fillers, plasticizers, etc. and other cooperating solvents.

The impregnation step may be accomplished by the use of convenient equipment and procedures. In a continuous operation, in order to achieve uniform tape thickness, it is important that the resin be constantly metered into the fabric so that a uniform take-up may be assured. This is most simply accomplished by passing the glass fabric through the resin solution and thereafter metering the excess solution. The metering means may comprise two opposing knife edges between which the saturated web is passed. The slit provided by such two opposing knife edges may be varied by micrometer adjustments to insure more accurate metering capability. The resin solution may conveniently be contained within a trough or the like provided with necessary smoother guide or sinker rolls. Other coating and metering means will be apparent to those skilled in the art.

The optimum concentrations of the 0.35 intrinsic viscosity polycarbonate resin in the dried impregnated glass fabric have been found to be substantially within the range of 48% to 54% inclusive by weight. This range, however, may vary considerably depending upon the properties desired in the finished product, the molecular weight of the polycarbonate resin, and the nature of the glass fabric. Therefore, the polycarbonate resin concentration according to these specific requirements may lie within a range of 30% to 60% by weight. The concentration by weight of such primer coatings as are present will be substantially less than that of the polycarbonate impregnant. In general, the concentration of the precoated elastomer will be substantially from 1% to 10% inclusive.

The drying of the impregnated glass fabric may be accomplished through any convenient means. It is essential, however, that substantially all volatile polycarbonate solvent be removed from the web during the drying procedure. It is satisfactory, for example, to air dry the impregnated web to a tack-free state and then to complete the drying by baking at 130° C. for one hour. Alternatively, the drying may be completed in a vacuum oven. A drying tower or a series of drying towers is particularly satisfactory for continuous large-scale operations.

Magnetic tape must be smooth, flat and uniform in thickness since a completely noise-free tape has top and bottom magnetic surfaces that are absolutely flat with respect to each other. Accordingly, it is essential to this invention that the impregnated dried reinforced base material be treated in order to obtain a smooth, dimensionally uniform tape base. A tape base having these optimum required properties is defined herein as being dimensionally sized and is achieved in every instance through a process of heat pressing. One mode of achieving a dimensionally sized base or supporting lamina is through impregnation of the glass fabric followed by a subsequent lamination, under heat and pressure, of a polycarbonate film to both sides of the impregnated glass fabric. In this mode a lower molecular weight resin solution of 5% to 7% solids concentration may be used so as to cause in situ precipitation in the fiber bundles. The film which is then laminated to either side of the thus-impregnated dry web, consists essentially of a higher molecular weight polycarbonate resin, the overall assembly then being united and dimensionally sized by the application of heat and pressure.

Other modes of dimensionally sizing an impregnated dried glass fabric base include the application of heat and pressure to the base through heat-pressing or ironing means. This may be achieved through a calendering operation using heated calender rollers. In calendering it is desirable to provide the rolls with a resilient surface or, alternatively, to feed a resilient sheet between the rolls and the base material. Conventional laminating presses may also be used which, for continuous treatment of the impregnated base, may be adapted to an ironing process wherein the impregnated base is sandwiched between stainless steel foils, aluminum foils, Mylar foils, or the like, and the sandwich drawn through an extended heated slot between the press platens. In such a modification it is often desirable to have a plastic or resilient material placed between the platen surfaces and the traveling foils.

For processing continuous lengths of material a modified ironing process is preferred. In this process a continuous impregnated glass fabric is sandwiched between two co-extensive stainless steel foils or webs and the entire assembly is continuously drawn through a heated and dimensionally-controlled gap providing a controlled heating zone, a cooling zone in series therewith, pressure varying means and rate-controlling means. The heating and cooling zones are in series and the heating means will preferably have glass-filled Teflon pressure surfaces. Most conveniently, each metallic foil in the traveling sandwich may comprise an endless band whereby there is provided a continuous double moving platen press including heating and cooling means.

The following example is illustrative of a preferred mode of the process of this invention in forming a completed base or supporting lamina.

Example 3

Fifty foot rolls of four inch wide Style 103 Exeter glass fabric are bulk heat cleaned. A primer coating of Elvax 150 is applied to the heat cleaned fabric with the solution concentration adjusted so that the fabric will pick up 10% by weight of the resin. The precoated fabric is dried and the rough edges are trimmed using a knife edge slitter. The fabric is then impregnated with a polycarbonate resin of approximately 15,000 molecular weight and the impregnated material is vacuum dried. The dried, impregnated fabric is then continuously pressed with application of heat and pressure in a double endless platen press.

The completed dimensionally sized base lamina is then united with the magnetic lamina with the application of heat and pressure. The laminae are brought together in intimate, direct, co-extensive contact with the base lamina preferably supported by a second temporary support substantially similar to the first temporary support provided for the formation of the magnetic lamina. The resulting composite is then heat pressed in a laminating press or by means of any convenient related device. A more uniform pressing surface may be achieved by a resilient or plastic material placed between the composite and the heated metallic surfaces of the press. Teflon or glass filled Teflon may be used for this purpose.

Example 4

A magnetic laminate prepared from the dispersion of Example 1 and having a film thickness of 0.5 mil was laminated to a woven glass fabric reinforced base material as prepared above the having a thickness of 1.0 mil. Following pressing at 150° C. for approximately one minute at 300 lbs. per square inch and cooling under pressure the overall thickness was 1.5 mils. The magnetic lamina was firmly adherent to the base as determined by the procedure known in the art as the "Scotch tape" test.

Example 5

A magnetic lamina prepared from the dispersion of Example 2 above and having a thickness of 0.7 mil was pressure laminated to a woven glass reinforced base lamina prepared as above and having a thickness of 1.0 mil. The composite assembly was pressure laminated at 140° C. for thirty seconds at 150 lbs. per square inch, followed by cooling under pressure. The overall thickness of the laminate was 1.7 mil. The adherence of the magnetic lamina was unaffected by the Scotch tape test. The magnetic lamina remained substantially adherent to the base even when subjected to scratching with a scalpel.

For continuous lamination the compoiste co-extensively sandwiched between first and second continuous temporary supports may be drawn through the press. The pressing means here may be then substantially identical with the pressing means employed in the dimensionally sizing of the impregnated base lamina. Further, a double endless moving platen press may be employed for the pressure lamination. In this case each of the traveling bands or platens can represent, respectively, one of the temporary supports. Heating means, cooling means, pressure adjusting means and rate controlling means may be provided, and, as a preferred embodiment, this process of lamination will employ substantially the same pressing means as the preferred mode of pressing the impregnated glass fabric base. An advantage of this system is that one of the endless traveling bands may further provide the first temporary support for casting, orienting, and drying the magnetic dispersion with provision of a coating head or means, drying means and orienting means. The first temporary support, stripped from the laminate (as is the second temporary support) following pressure lamination, is returning continuously under the coating head or means.

The magnetic laminate as thus prepared may then be slit to furnish the final completed tape of desired width. All of the process stages of this invention may be performed in step-wise, continuous, or semi-continuous procedures.

In some circumstances, it has been found desirable to provide on the surface of the supporting lamina opposite the magnetic lamina a second supported lamina in coextensive, direct, adherent contact therewith, the second supported lamina comprising a non-magnetic particulate filler material dispersed in a polycarbonate resin. The preparation of such a filled lamina and its lamination to the tape base may be by a process substantially identical to that discussed above with respect to the magnetic lamina. Any non-magnetic, finely-dispersed filler material may be used. Satisfactory results have been obtained with 70 parts of 10 micron silica (obtained from the Pennsylvania Glass Sand Corporation under the trade name Min-U-Sil), 30 parts of a polycarbonate resin of intrinsic viscosity 0.35, and 400 parts of trichloroethane, the preparation being cast coated as described for the preparation of the magnetic lamina. This process furnishes particularly satisfactory results when the base lamina consists essentially of an extruded, and thus dimensionally sized, Lexan polycarbonate plastic film and the cupping, which would normally be expected when a filled system is laminated to a non-filled system, is thus avoided. Advantages may also be derived by lamination of the non-magnetic filled lamina to a glass fabric reinforced base.

*Example 6*

A film of the above silica dispersion was cast onto a 1 mil stainless steel strip and dried thereupon to a thickness of 0.7 mil. This was laminated in combination with a magnetic lamina of 0.4 mil and a strip of 1 mil extruded Lexan film at 170° C. for three to four seconds at 300 lbs. per square inch. The resulting laminate comprising on either side, respectively, of the polycarbonate film, a magnetic lamina and a non-magnetic filled lamina, had an over-all thickness of 1.5 mil. Both filled laminae adhered firmly to the supporting film and exhibited less elongation than in the case of a non-laminated Lexan film.

We claim:

1. A magnetic laminate useful as a magnetic recording tape or the like comprising a non-magnetic supporting lamina, a magnetically susceptible supported lamina fused in co-extensive direct adherent contact to a surface of said supported lamina, said supporting lamina comprising a polyester of carbonic acid and a polyhydroxy organic compound, said supported lamina comprising a magnetically susceptible material dispersed in a polyester of carbonic acid and a polyhydroxy organic compound, said supported and supporting laminae being essentially volatile solvent and adhesive free upon assembly of said laminate, and said polycarbonate supporting lamina having been dimensionally sized by prior application thereto of heat and pressure.

2. The laminate of claim 1, wherein said non-magnetic supporting lamina comprises a multi-filament glass fabric impregnated with said polyester of carbonic acid and a polyhydroxy organic compound.

3. The laminate of claim 2, wherein said supporting lamina further comprises upon at least one surface thereof a laminated film consisting essentially of a high molecular weight polyester of carbonic acid and a polyhydroxy organic compound.

4. The laminate of claim 2, wherein said fabric is further defined as being non-woven.

5. The laminate of claim 2, wherein said fabric is further defined as being woven.

6. The laminate of claim 5 wherein said woven glass fabric is further defined as being distorted whereby the weft yarns of said fabric are at substantially 15°–45° angle to the warp yarns thereof.

7. The laminate of claim 2 further comprising a coating of a polyethylene-vinyl acetate copolymer upon said glass fabric.

8. The laminate of claim 7, wherein said glass fabric has been heat cleaned prior to coating with said polyethylene vinyl-acetate copolymer.

9. The laminate of claim 1, wherein said supporting lamina comprises a film formed of a polyester of carbonic acid and a polyhydroxy organic compound, one surface of said film being in co-extensive direct adherent contact with a surface of said supported lamina, the other surface of said film being in co-extensive direct adherent contact with a second supported lamina, said second supported lamina comprising a non-magnetic particulate filler material dispersed in a polyester of carbonic acid and a polyhydroxy organic compound.

10. A process of preparing a magnetic laminate useful as a magnetic recording tape or the like comprising in combination the steps of coating a temporary support with a composition comprising a polyester of carbonic acid and a polyhydroxy organic compound, a volatile organic solvent therefor and a dispersion therein of a magnetically susceptible material; magnetically orienting said magnetically susceptible material while dispersed in said composition upon said temporary support; drying said composition by evaporation of said solvent upon said temporary support thereby forming a magnetically susceptible lamina thereupon; bringing said magnetically susceptible lamina into contact with an essentially volatile polycarbonate solvent free supporting lamina comprising a polyester of carbonic acid and a polyhydroxy compound, said supporting lamina having been dimensionally sized by prior application thereto of heat and pressure; applying heat and pressure to unite said magnetically susceptible lamina to said supporting lamina; and stripping said temporary support therefrom.

11. The process of claim 10 further comprising in combination the steps of impregnating a multi-filament glass fabric with a composition comprising a polyester of carbonic acid and a polyhydroxy organic compound, and a volatile organic solvent therefor; removing therefrom said volatile organic solvent; and dimensionally sizing the dried impregnated fabric by the application thereto of heat and pressure thereby forming said supporting lamina.

12. The process of claim 11 wherein said multi-filament glass fabric is non-woven.

13. The process of claim 11, wherein said multi-filament glass fabric is woven.

14. The process of claim 13 wherein said woven glass fabric is distorted whereby the weft yarns thereof are at an angle of substantially 15°–45° with respect to the warp yarns thereof.

15. The process of claim 11, wherein said glass fabric is pre-coated with a polyethylene-vinyl acetate copolymer.

16. The process of claim 15, wherein said glass fabric is heat cleaned prior to being pre-coated with said polyethylene-vinyl acetate copolymer.

17. The process of claim 15 further comprising in combination the steps of providing a second temporary support for said supporting lamina and bringing said supporting lamina into contact mutually with said magnetically susceptible lamina; applying heat and pressure to unite said magnetically susceptible lamina to said supporting lamina; said heat and pressure being applied through the surfaces of said temporary support and said second temporary support oppositely from the laminae supported thereupon; and stripping said temporary support and said second temporary support therefrom.

18. The process of claim 17, wherein each of said temporary support and said second temporary support comprises continuous foil strips.

19. The process of claim 17, wherein each of said temporary support and said secondary temporary support comprises endless belts.

20. The process of claim 10, wherein said supporting lamina comprises an extruded film formed of a polyester of carbonic acid and a polyhydroxy organic compound, one surface of said extruded film being united with said magnetically susceptible lamina; said process further comprising the step of uniting the other surface of said extruded film with a second lamina, said second lamina comprising a non-magnetic particulate filler material dispersed in a polyester of carbonic acid and a polyhydroxy organic compound.

References Cited

UNITED STATES PATENTS 2,799,609  7/1957  Dalton.
3,179,533  4/1965  Rusch _____ 161—93

ALEXANDER WYMAN, *Primary Examiner.*

M. LITMAN, *Assistant Examiner.*